United States Patent [19]
Rottmayer

[11] Patent Number: 5,880,912
[45] Date of Patent: Mar. 9, 1999

[54] MAGNETIC HEAD WITH BIASED GMR ELEMENT AND SENSE CURRENT COMPENSATION

[75] Inventor: Robert E. Rottmayer, Fremont, Calif.

[73] Assignee: Read-Rite Corporation, Milpitas, Calif.

[21] Appl. No.: 998,925

[22] Filed: Oct. 30, 1997

Related U.S. Application Data

[63] Continuation of Ser. No. 542,988, Oct. 13, 1995, abandoned.

[51] Int. Cl.$^6$ ........................................................ G11B 5/39
[52] U.S. Cl. ................................................................ 360/113
[58] Field of Search ............................................. 360/113

[56] References Cited

U.S. PATENT DOCUMENTS

| | | | |
|---|---|---|---|
| 4,673,998 | 6/1987 | Souda et al. | 360/113 |
| 5,375,022 | 12/1994 | Gill et al. | 360/113 |
| 5,446,613 | 8/1995 | Rottmayer | 360/113 |
| 5,508,867 | 4/1996 | Cain et al. | 360/113 |
| 5,576,914 | 11/1996 | Rottmayer et al. | 360/113 |

*Primary Examiner*—A. J. Heinz
*Attorney, Agent, or Firm*—Nathan N. Kallman

[57] ABSTRACT

A magnetic head incorporates a giant magnetoresistive sensing element having a magnetic bias field associated therewith. The orientation direction of the magnetic bias field is canted to reduce or cancel the effect on the sensing element of the magnetic field produced by applied sense current.

6 Claims, 4 Drawing Sheets

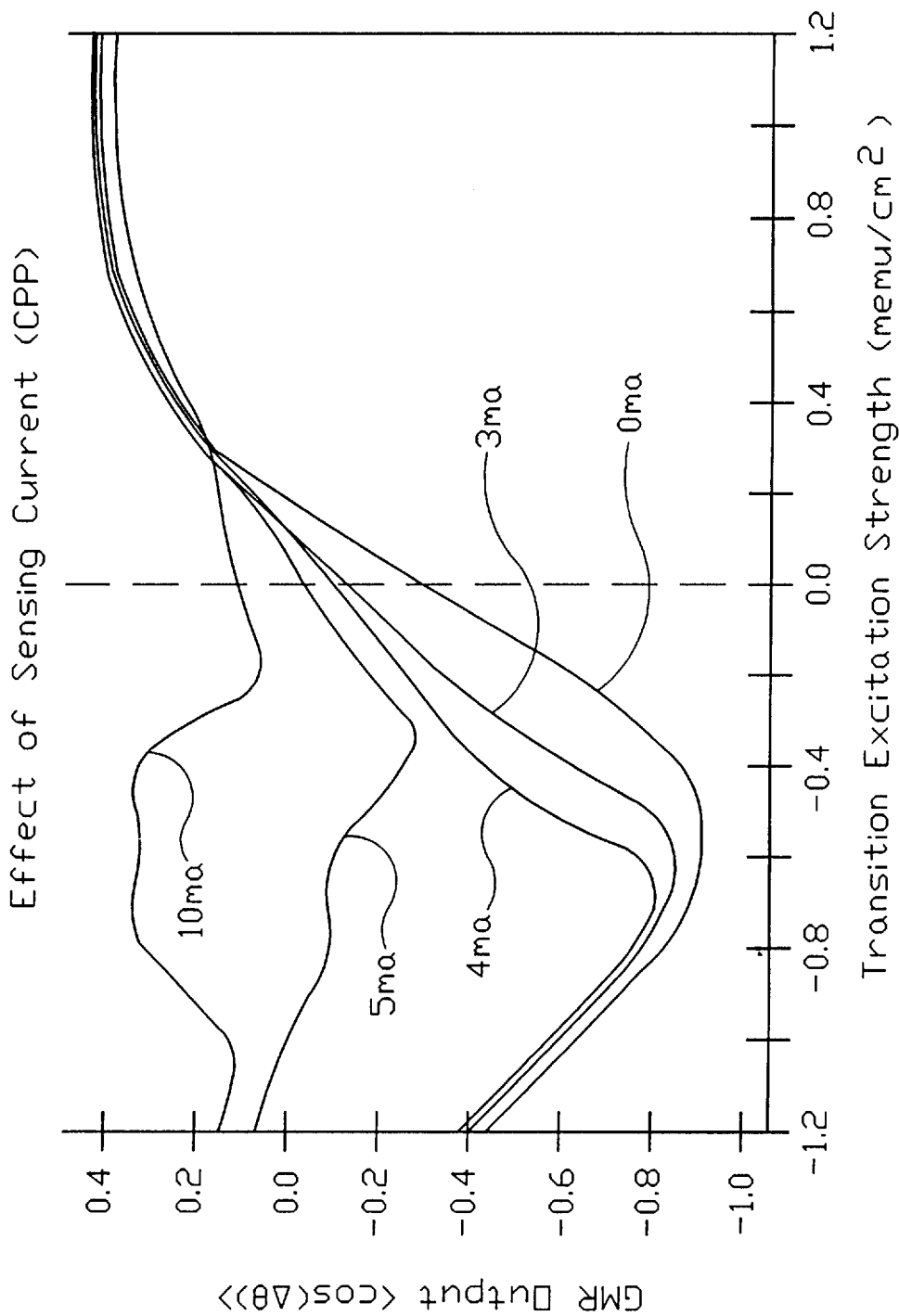

MAGNETIC HEAD WITH BIASED GMR ELEMENT AND SENSE CURRENT COMPENSATION

This application is a continuation of application Ser. No. 08/542,988, filed Oct. 13, 1995, now abandoned.

U.S. Pat. No. 5,576,914, which issued on Nov. 19, 1996, Ser. No. 08/337,878, filed discloses a giant magnetoresistive (GMR) element in which the orientations of the magnetic domain regions are biased by a soft magnetic element. The subject matter of that patent is related to the present application and is incorporated herein by reference.

CROSS-REFERENCE TO RELATED PATENT

1. Field of the Invention

This invention relates to thin film magnetic heads and in particular to a structure for a thin film magnetic head incorporating a GMR read head.

2. Description of the Prior Art

Presently known thin film magnetic heads or transducers include an inductive write element for recording signals and a magnetoresistive (MR) element for reading the recorded signals. Write operations are carried out inductively using a pair of magnetic write poles which form a magnetic path and define a transducing nonmagnetic gap in the pole tip region. The transducing gap is positioned to fly close to the surface of an adjacent recording medium such as a rotating magnetic disk. An electrical coil is formed between the poles for providing current representative of signal information to be recorded and to cause flux flow in the magnetic path of the poles.

Read operations are carried out by the MR element which is spaced from a pair of magnetic shields. A sense current is passed through the MR element for sensing the resistance of the MR element, which changes in response to changes in magnetic flux or transitions received from the adjacent recorded medium.

Conventionally, the MR element was electrically isolated from the pair of magnetic shields, and a separate set of conductors were provided on one surface of the MR element to pass a reference current through the MR element in a Current-In-The-Plane (CIP) mode. However, the CIP mode can create problems such as shorting due to electromigration. Also, a CIP mode MR element can be relatively large in size and expensive to mass produce because of its complex construction.

More recently, a compact MR head has been developed in which the magnetic write poles serve also as the shields for the MR element and further as a means for conducting the MR sense current. The structure and method of forming such a compact MR head is disclosed in U.S. Pat. No. 5,446,613 to R. Rottmayer, which is incorporated herein by reference.

In accordance with the invention disclosed in U.S. Pat. No. 5,576,914, a compact read/write head includes a magnetically biased GMR element which provides reduced noise in the read signal and improves the linearity and gain of flux sensing. Typically, the GMR element is made of alternating ultra-thin layers of magnetically conductive and nonconductive materials such as cobalt and copper. The GMR element is magnetically biased such that the major domains of alternating layers of the GMR element define a scissor-type configuration when no excitation field is supplied by an adjacent magnetic storage medium.

When an excitation field is supplied by the adjacent magnetic storage medium, it rotates the scissor configuration from a crossed (90°) state towards either a closed (0°) state or an anti-parallel (180°) state, depending on the polarity of the excitation field. The resultant change in cosine (and resistance of the GMR element which is a function of cosine) is therefore from zero (cosine 90°) to a positive one (cosine 0°=+1.0) or to a negative one (cosine 180°=−1.0). The resultant change in resistance of the GMR element therefore indicates the polarity of change of the excitation field.

SUMMARY OF THE INVENTION

With the structure disclosed in U.S. Pat. No. 5,576,914, it has been found that the magnetic fields generated by the sense current tend to limit the magnitude of the sense current which can be employed. In accordance with this invention, the direction of the bias magnetization field is canted relative to the direction shown in U.S. Pat. No. 5,576,914. This canting of the magnetic biasing field effectively reduces magnetic fields from the sense current, thereby resulting in an increase in the obtainable sense current by a factor of 1.2 to 4.

DESCRIPTION OF THE DRAWINGS

FIG. 4 are graphs illustrating the response of a GMR head to variations in sense current amplitude in the absence of the present invention.

DESCRIPTION OF THE PREFERRED EMBODIMENT

Figure 1A:
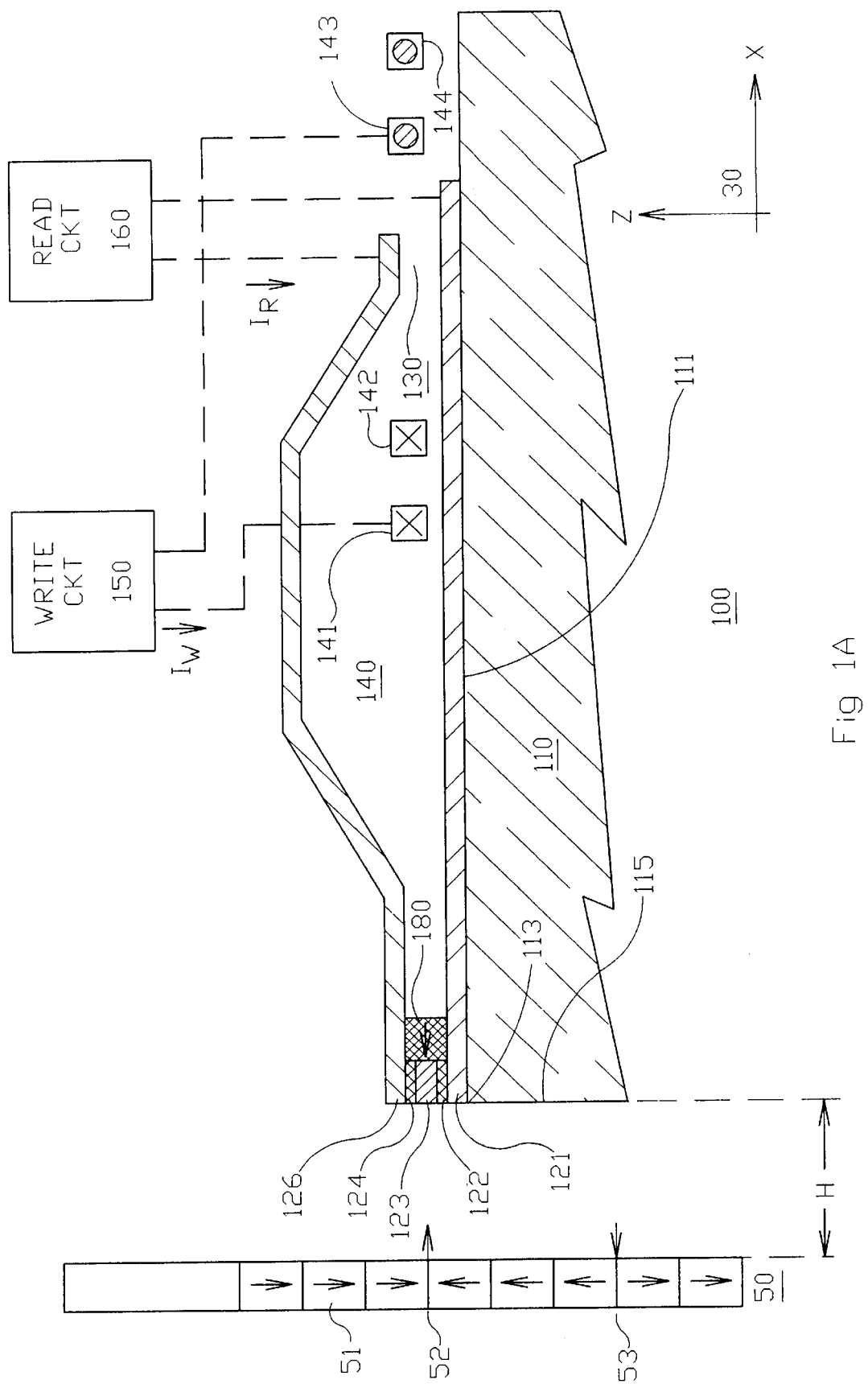
FIG. 1A is a cross-sectional side view showing a biased GMR head structure in accordance with the invention.

FIG. 1A shows a cross-sectional view of a magnetic head structure 100 with a magnetic medium 50 adjacent to the magnetic head 100. Magnetic medium 50 moves relative to head structure 100 along the Z direction (+Z or −Z). Head structure 100 is spaced from medium 50 in the X direction by an aerodynamically-defined flying height H.

Magnetic medium 50 has a plurality of pre-oriented flux regions 51 defined on its surface, each directed either in the +Z direction or the −Z direction. For purpose of example, a first transition 52 that is defined by opposingly-oriented flux regions 51 is shown producing a first fringe field extending in the +X direction beyond the medium. A second transition 53 that is defined by other opposingly-oriented flux regions 51 is shown producing a second fringe field extending in the −X direction.

As head structure 100 is passed by transition regions 52 and 53, GMR portion 123 of the head structure 100 detects the flux or fringe fields and responds by changing its resistance. A substrate 110 that is shaped as an air bearing slider made of a magnetically nonconductive material, such as ceramic, forms a bulk portion of the head structure 100 and provides aerodynamic lift.

Substrate 110 has a substantially planar top surface 111 extending in the X direction and a medium-facing sidewall 115 cut substantially at right angles to top surface 111 so as to extend in the Z direction. The end of top surface 111 that meets with substrate sidewall 115 is referred to as the forward edge 113.

A first pole/shield layer 121, made of a material that is both magnetically and electrically conductive (an EC/MC material), is formed conformably on substrate top surface 111 extending to forward edge 113. The material of first pole/shield layer 121 can be a nickel-iron composition, such as Permalloy, or a ferromagnetic material with high permeability. The Z direction thickness of first pole/shield layer 121 is preferably in the range of 0.5 to 10 microns and more preferably in the range of 2 to 3 microns.

The abbreviation form Ex/Mx will be used below to describe the electrical and magnetic conductivity properties of various materials, with x=C meaning it is conductive, x=N meaning it is nonconductive, and x=X meaning it can be either. Thus, EN/MC means electrically nonconductive and magnetically conductive, and EX/MN means the material is either electrically conductive or nonconductive, but it is magnetically nonconductive.

A first contact element 122 made of an EC/MN material is formed over a forward portion of first pole/shield layer 121, near the substrate's forward edge 113. First contact element 122 can be composed of one or a combination of EC/MN materials selected for example from the group consisting of copper, gold, silver, and alloys of these metals. The Z direction thickness of first contact element 122 is preferably in the range of 100 Å to 2000 Å and more preferably in the range of 300 Å to 1500Å.

GMR element 123 is formed over first contact element 122. GMR element 123 may be formed, by way of example, by depositing a plurality of alternating ultra-thin layers of magnetically conductive and nonconductive materials such as cobalt and copper, each layer being approximately 20 Angstroms thick. The overall Z direction thickness of GMR element 123 is preferably in the range of 60 Å to 1000 Å and more preferably in the range of 100 Å to 500Å.

As known, the electrical resistance of such a GMR element 123 fluctuates when exposed to a time-varying magnetic flux. Unlike inductive transducers, a magnetoresistive element is sensitive to the magnitude of a flux transition rather than to the rate of change of the flux transition. This gives magnetoresistive elements certain advantages over inductive transducers, such as insensitivity to disk speed changes, for example.

A second contact element 124, made of an EC/MN material that is the same or equivalent to that of first contact element 122, is formed over GMR element 123. The Z direction thickness of second contact element 124 is substantially the same as that of first contact element 122.

A second pole/shield layer 126, made of an EC/MC material that is the same or equivalent to that of first and second pole/shield layer 121, is formed over second contact element 124 and extended backwards in the +X direction to define a back gap 130 with first pole/shield layer 121. The Z direction thickness of second pole/shield layer 126 is substantially the same as or greater than that of first pole/shield layer 121.

Back gap 130 is filled with a material that is electrically nonconductive such as Al$_2$O$_3$, SiN or hard-baked resist.

Figure 1B:
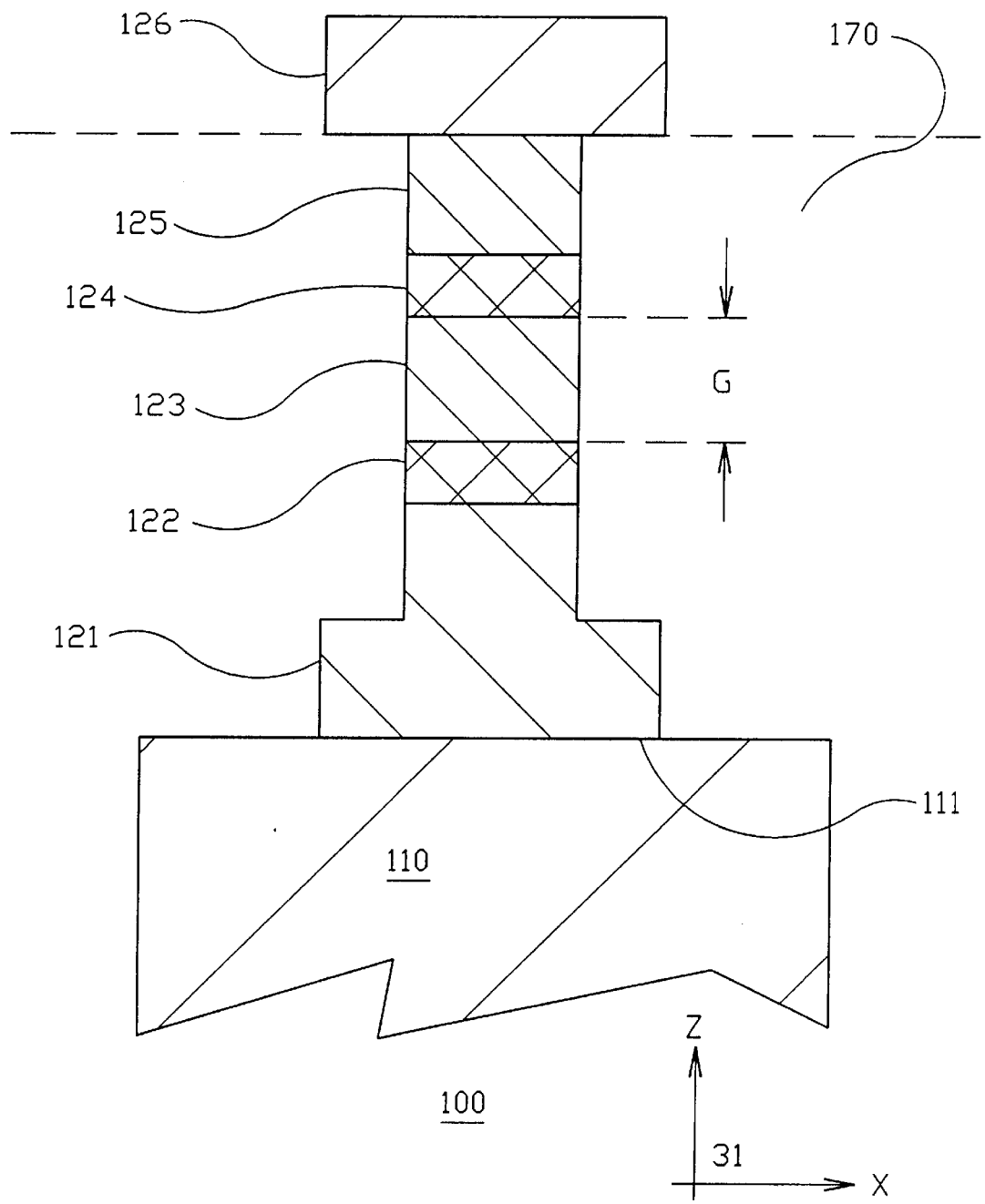
FIG. 1B is a cross-sectional front plan view of the biased GMR head structure of FIG. 1A.

The space at forward edge 113 between the top of first pole/shield layer 121 and the bottom of second pole/shield layer 126 defines a forward write gap (G in FIG. 1B). The dimension of forward gap G is defined by the combined Z direction thicknesses of first contact element 122, GMR element 123 and second contact element 124. The Z dimension of back gap 130 should be no more than that of the forward gap and is more preferably made as small as possible while still assuring electrical insulation between the first and second pole/shield layers 121 and 126.

Referring to FIG. 1B, which is a front plan view of a relevant portion of head structure 100 as seen in the Y-Z plane 31, elements 121 through 126 preferably define an I-beam profile. The Y direction width in the stem portion of the I-beam profile, which is defined by an upper part of element 121, elements 122 through 124 and the lower part of element 126, is preferably in the range of 0.1 to 2 microns. The bottom and top caps of the I-beam profile, which are defined, respectively, by an upper part of element 121 and element 126, may be wider, preferably by a factor of 1.5 to 10 times.

The Z direction height of the lower part of second pole/shield layer 126 in FIG. 1B is preferably 1 to 10 times G, and more preferaby approximately 3 times G. The Z direction height of the upper, stem-forming portion of element 121 (the first pole/shield layer), similarly is preferably 1 to 10 times G, and more preferably approximately 3 times G.

Although not shown fully, an EN/MN fill and planarizing structure composed of one or more materials, such as Al$_2$O$_3$ or hard-baked resist or SiN, surrounds the I-beam profile from substrate top surface 111 to at least the bottom of second pole/shield layer 126. Pole/shield layer 126 can also be shrouded by a passivating EN/MN material if desired.

Referring again to FIG. 1A, the X direction length of elements 122 through 124 is preferably 50 to 200 microns and more preferably in the range of 100 to 150 microns. As seen in FIG. 1A, the first and second pole/shield layers 121 and 126 extend in the +X direction beyond sandwiched elements 122 through 124.

A planar coil 140 having electrically conductive winding members such as indicated at 141–144 is formed about back gap 130 and electrically insulated from pole/shield layers 121 and 126 by EN/MN fill and planarizing structure.

A write circuit 150 connects to opposed ends of coil 140 (e.g., to members 142 and 144 in the case where the coil has a spiral-shaped top view), and during a write mode sends electrical current I$_w$ passing in a first direction (+Y) through winding members 141–142 positioned on a forward side of back gap 130 and sends electrical current passing in a second direction (−Y) where +Y and −Y lie in a direction "Y" (not shown) that projects orthogonally relative to the surface of the paper and is perpendicular to the X and Z directions through winding members 143–144 positioned on a rear side of back gap 130, to induce flux flow through the forward and back gaps. Changes in flux flow across the forward gap produce the different magnetic orientations of magnetized regions 51 in magnetic medium 50 during a write operation.

A read circuit 160 connects to opposed back ends of pole/shield layers 121 and 126, and during a read mode sends a sense current I$_R$ passing in the Z direction through sandwiched elements 122 through 124. The read-sense current in I$_R$ flows perpendicularly through GMR element 123, thus avoiding the in-the-plane electromigration problems and magnetic biasing problems associated with earlier designs based on CIP operation.

An electrically nonconductive, magnetic biasing element 180 is positioned behind the combination of first contact element 122, GMR element 123 and second contact element 124. Biasing element 180 is also sandwiched between first and second pole/shield layers 121 and 126. Biasing element 180 produces a magnetic biasing field that extends substantially along the X direction (+X or −X) into GMR element 123.

Figure 2:
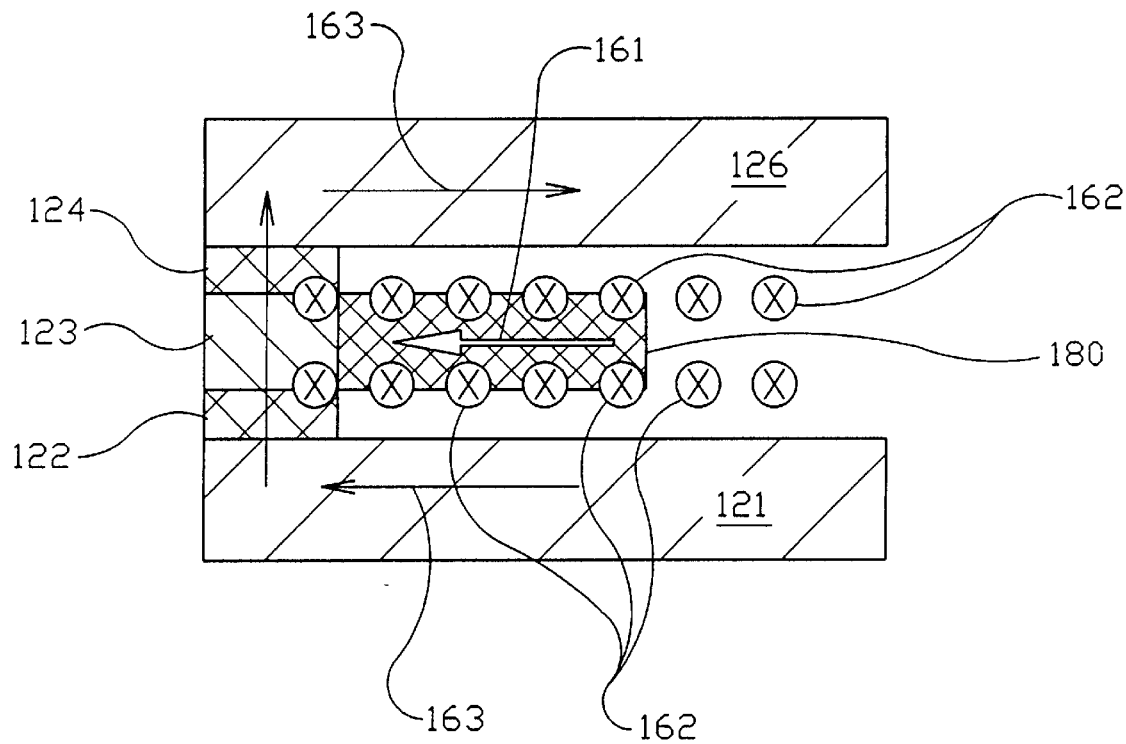
FIG. 2 is an enlarged cross-sectional side view of a portion of the novel GMR head structure showing the direction of magnetic fields therein.

Referring to the enlarged side view of FIG. 2, reference numeral 161 identifies an arrow which represents the bias magnetization field from bias magnet 180, while circled Xs 162 represent the ends of magnetic field lines (shown as arrows 162 in FIG. 3) of the magnetic field induced by the canting of the bias magnet. The sense current is represented by arrows 163, flowing in bottom pole 121, GMR element 123 and top pole 126. The top view of FIG. 3, in which the top pole 126 and conductor 124 have been removed, shows the canting of magnetic bias field arrow 161 in accordance with the present invention, arrow 161 being canted relative to the horizontal in FIG. 3, its components being in the X-Y plane. The component 162 of the bias field (see FIG. 3) has the effect of reducing or eliminating the circular magnetic field produced by the sense current. The component 162 of the magnetic bias field 161 is stronger near the magnet 180 where it cancels the field from the sense current. On the other side of the GMR element 123, the field component 162 is smaller and adds to the field from the sense current. The overall effect is a net cancellation of some of the sense current due to the gradient in the Y component of the magnetic bias field.

The graphs of FIG. 4 show the effects of variations in the amplitude of sense current on the output of a GMR transducer operating in the CPP (Current Perpendicular To The Plane) mode. For sense currents in the range of 0 to 4 milli-amperes (ma) amplitude, the GMR output signal is quite linear between a transition excitation strength of $-0.5$ memu/cm$^2$ and a strength of $+0.2$ memu/cm$^2$. However, at sense current amplitudes above 4 ma, the GMR output response is nonlinear, as shown by the graphs for 5 ma and 10 ma, thereby rendering these values of sense current unsuitable for use.

Figure 3:
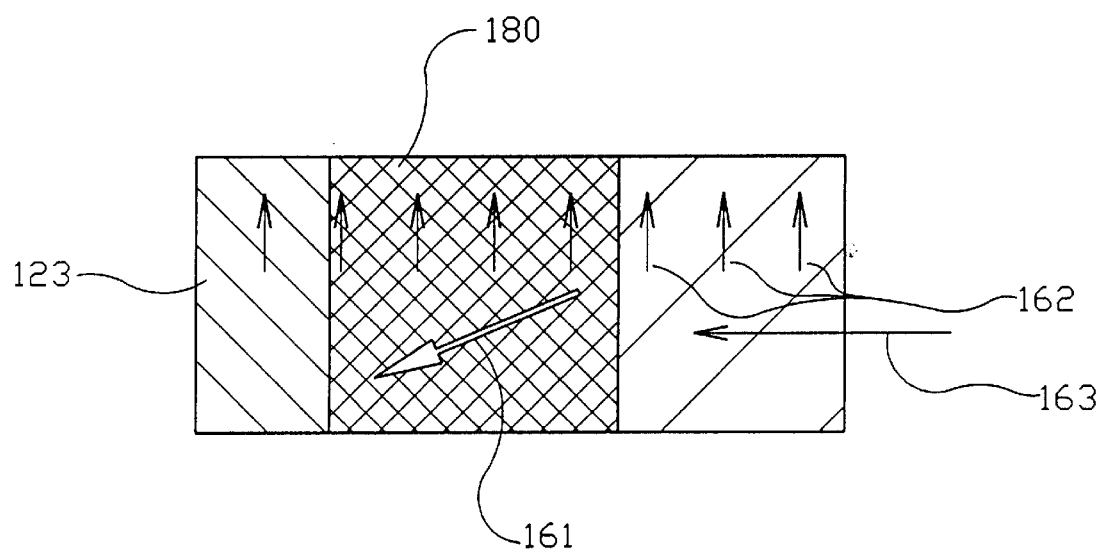
FIG. 3 is an enlarged cross-sectional top view of a portion of the GMR head structure made in accordance with the present invention showing the canting of the bias magnetic field.

It is this nonlinearity which is eliminated in accordance with the present invention by canting or angling the orientation of the magnetic field from bias magnet means 180, as shown in FIG. 3. The vertical component of the canted magnetic bias field reduces the effect on the bias field of the magnetic field resulting from the sense current, resulting in linearization of the GMR transducer response over a larger range of values of sense current thereby permitting the use of sense currents of amplitudes 1.2–4 times greater than those usable without a canted bias field. In the example represented by FIG. 4, for a read element with dimensions of ½$\mu$×¼$\mu$ and a flying height of $\leq$250Å, the preferred range for transition excitation strength is from $-0.3$ memu/cm$^2$ to $+0.3$ memu/cm$^2$ to ensure operation in a linear range of GMR output.

What is claimed is:

1. A thin film magnetic head for detecting flux transitions in a magnetic medium having magnetically oriented regions therein comprising:

a magnetoresistive element for sensing said magnetically oriented regions in said magnetic medium;

a single nonconductive bias magnet adjacent to said magnetoresistive element for generating a magnetic bias field in said element, said magnetic bias field having a defined direction of bias magnetization;

a single sensing means for supplying a single sense current flowing in only one direction to said magnetoresistive element to detect changes in the resistance of said element in response to said magnetically oriented regions in said medium, said sense current generating a magnetic field in said magnetic head; and said bias magnet providing for canting of the orientation of said magnetic bias field to produce a component of said canted magnetic bias field which opposes the magnetic field of said sensing means and which is stronger near said bias magnet to effectively reduce the effect on said magnetic bias field by the magnetic field generated by said sensing means, such reduction of the magnetic field of said sensing means being greater near said bias magnet so that a unidirectional gradient in said component of said magnetic bias field is produced, thereby providing linearization of the response of said magnetic head over an increased range of values of sense current so that sense currents of amplitudes up to 10 milli-amperes can be used.

2. A thin film magnetic head in accordance with claim 1 in which the orientation of said magnetic bias field is modified to have a substantial component opposite to the direction of orientation of said magnetic field generated said sensing means.

3. A magnetic head according to claim 1 wherein said magnetoresistive element comprises a giant magnetoresistive element.

4. A magnetic head according to claim 3 wherein said giant magnetoresistive element has plural parallel planes and operates in a current perpendicular-to-the-plane mode.

5. A magnetic head according to claim 4 comprising first and second contact elements sandwiching said giant magnetoresistive element, said first and second contact elements being magnetically nonconductive and electrically conductive for directing to said magnetoresistive element a sense current from said sensing means that moves substantially perpendicularly through said plural parallel planes of said giant magnetoresistive element.

6. A magnetic head according to claim 5 comprising first and second pole/shield layers sandwiching the combination of said first and second contact elements and said giant magnetoresistive element, said first and said second pole/shield layers being magnetically conductive for shielding said magnetoresistive element from stray flux and being electrically conductive for directing said sense current into said magnetoresistive element.

* * * * *